(12) United States Patent
Veine et al.

(10) Patent No.: US 7,735,929 B2
(45) Date of Patent: Jun. 15, 2010

(54) INFINITELY ADJUSTABLE TWO-WAY HEAD RESTRAINT

(75) Inventors: Eric Veine, Wixom, MI (US); Arjun V. Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 128 days.

(21) Appl. No.: 11/755,519

(22) Filed: May 30, 2007

(65) Prior Publication Data

US 2008/0296953 A1    Dec. 4, 2008

(51) Int. Cl.
    B60N 2/48      (2006.01)
(52) U.S. Cl. ..................................... 297/410
(58) Field of Classification Search .................. 297/410
    See application file for complete search history.

(56) References Cited

U.S. PATENT DOCUMENTS

| | | | | |
|---|---|---|---|---|
| 3,547,486 A | * | 12/1970 | Herzer et al. ............ | 297/410 X |
| 4,099,779 A | * | 7/1978 | Goldner ................... | 297/410 X |
| 4,256,341 A | * | 3/1981 | Goldner et al. ............ | 297/410 |
| 4,411,470 A | | 10/1983 | Nishimura et al. | |
| 4,589,698 A | | 5/1986 | Suzuki | |
| 4,606,578 A | * | 8/1986 | Yasui ...................... | 297/410 X |
| 4,668,014 A | * | 5/1987 | Boisset ................... | 297/410 X |
| 4,671,573 A | * | 6/1987 | Nemoto et al. ............ | 297/410 |
| 4,798,415 A | * | 1/1989 | Tanino et al. ............. | 297/410 |
| 4,830,434 A | * | 5/1989 | Ishida et al. ............ | 297/410 X |
| 6,068,337 A | * | 5/2000 | De Filippo .............. | 297/410 X |
| 6,607,242 B2 | | 8/2003 | Estrada et al. | |
| 6,688,697 B2 | | 2/2004 | Baumann et al. | |
| 6,899,395 B2 | * | 5/2005 | Yetukuri et al. ......... | 297/410 X |
| 6,935,696 B2 | * | 8/2005 | Gauthier et al. ............ | 297/408 |
| 7,070,240 B2 | | 7/2006 | Schmitt et al. | |
| 7,108,327 B2 | | 9/2006 | Locke et al. | |
| 7,316,455 B2 | * | 1/2008 | Metz et al. ................... | 297/410 |
| 7,445,290 B2 | * | 11/2008 | Kopetzky et al. ........... | 297/410 |
| 2002/0043858 A1 | | 4/2002 | Svantesson et al. | |
| 2002/0093231 A1 | | 7/2002 | Estrada et al. | |
| 2003/0141751 A1 | * | 7/2003 | Stenzel et al. ............... | 297/410 |
| 2004/0195872 A1 | | 10/2004 | Svantesson | |
| 2006/0001308 A1 | | 1/2006 | Humer et al. | |
| 2006/0061188 A1 | | 3/2006 | Locke et al. | |
| 2006/0250017 A1 | * | 11/2006 | Otto et al. ................... | 297/410 |

FOREIGN PATENT DOCUMENTS

| CN | 1761591 A | 4/2006 |
|---|---|---|
| DE | 30 43 945 A1 | 6/1981 |
| DE | 10 2005 049 344 A1 | 4/2007 |

OTHER PUBLICATIONS

German Office Action dated Jul, 15, 2009, 4 pgs.
Chinese Office Action issued Nov. 27, 2009, 3 pgs.

\* cited by examiner

*Primary Examiner*—Rodney B White
(74) *Attorney, Agent, or Firm*—Brooks Kushman P.C.

(57) ABSTRACT

A head restraint includes at least one post adapted to engage a vehicle seat. The head restraint assembly also includes a bun which is moveably attached to the at least one post. A locking clasp is fixed relative to the bun and has an open configuration and a closed configuration. The open configuration allows movement of the bun relative to the at least one post to a position between a first and second position. The closed configuration inhibits movement of the bun relative to the at least one post.

14 Claims, 5 Drawing Sheets

US 7,735,929 B2

INFINITELY ADJUSTABLE TWO-WAY HEAD RESTRAINT

BACKGROUND OF THE INVENTION

1. Field of the Invention

In at least one aspect, the present invention relates to vehicle head restraints that are continuously positionable between a first and second position.

2. Background Art

Competitive pressure places a persistent demand on automobile manufacturers and suppliers to improve aesthetics and functionality of vehicle components. Head restraints are automobile interior components having the important function of providing support for a vehicle occupant's head during an accident.

In the typical vehicular head restraint assembly, a bun is moveably attached to a vehicle seat by one or more posts. In order to function properly, vehicular head restraints require positioning of the bun to a preferred position adjacent to the occupant's head. In the typical prior art assembly, the post(s) are notched in a manner that sets discrete locations for the positioning of the head restraint. Usually, the notches are engaged by a locking mechanism that holds the head restraint in place when they are not being adjusted. Although these prior art assemblies work reasonably well, the discrete nature of these head restraints does not allow the occupant to position them to several desired locations.

Accordingly, there exists a need for improvements to the prior art head restraint designs that allow improved positionability.

SUMMARY OF THE INVENTION

The present invention solves one or more problems of the prior art by providing in at least one embodiment, a head restraint assembly that is continuously positionable from a first position to a second position. The head restraint of this embodiment includes at least one post adapted to engage a vehicle seat. The head restraint assembly also includes a bun which is moveably attached to the at least one post. A locking clasp is fixed relative to the bun and has an open configuration and a closed configuration. The open configuration allows movement of the bun relative to at least one post. The closed configuration inhibits movement of the bun relative to the at least one post. Advantageously, the position of the bun is positionable at substantially any location between a first position and a second position.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
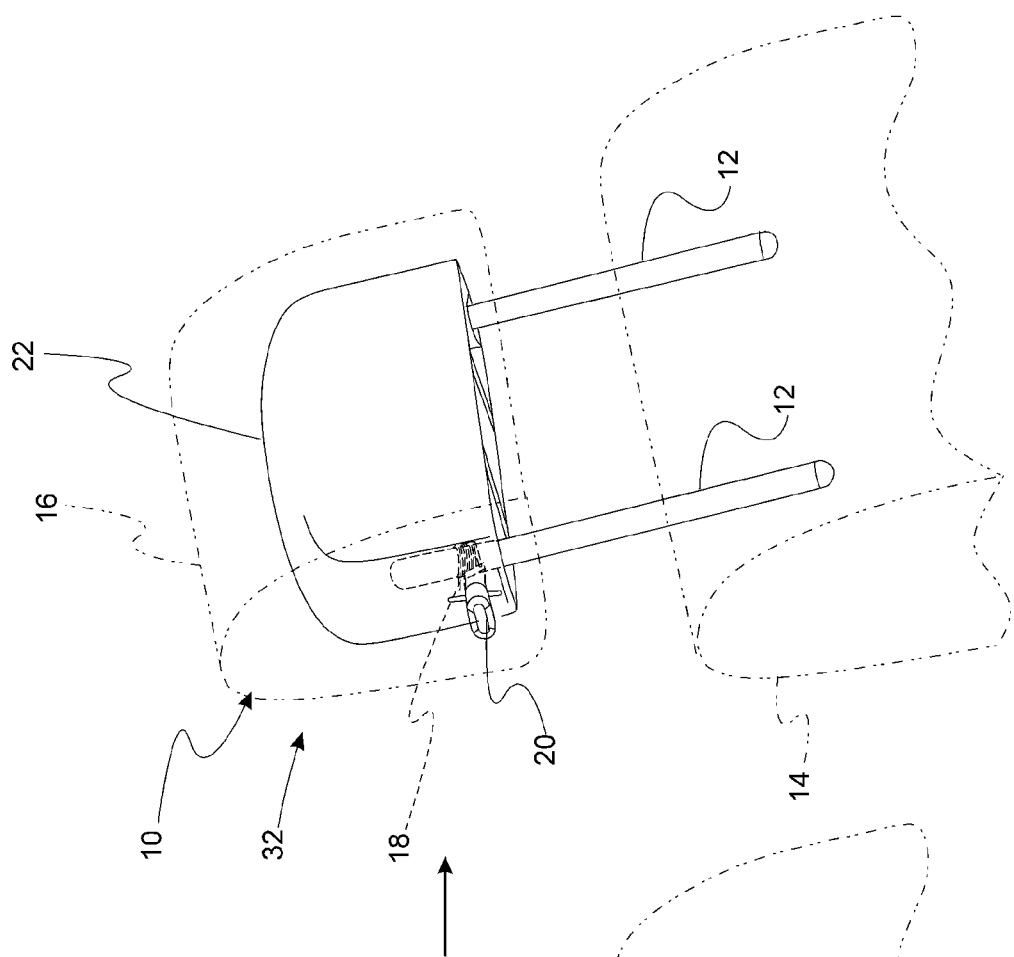
FIG. 1 is a schematic illustration of an embodiment of a continuously positionable head restraint assembly integrated into a vehicle seat assembly.
Figure 1:
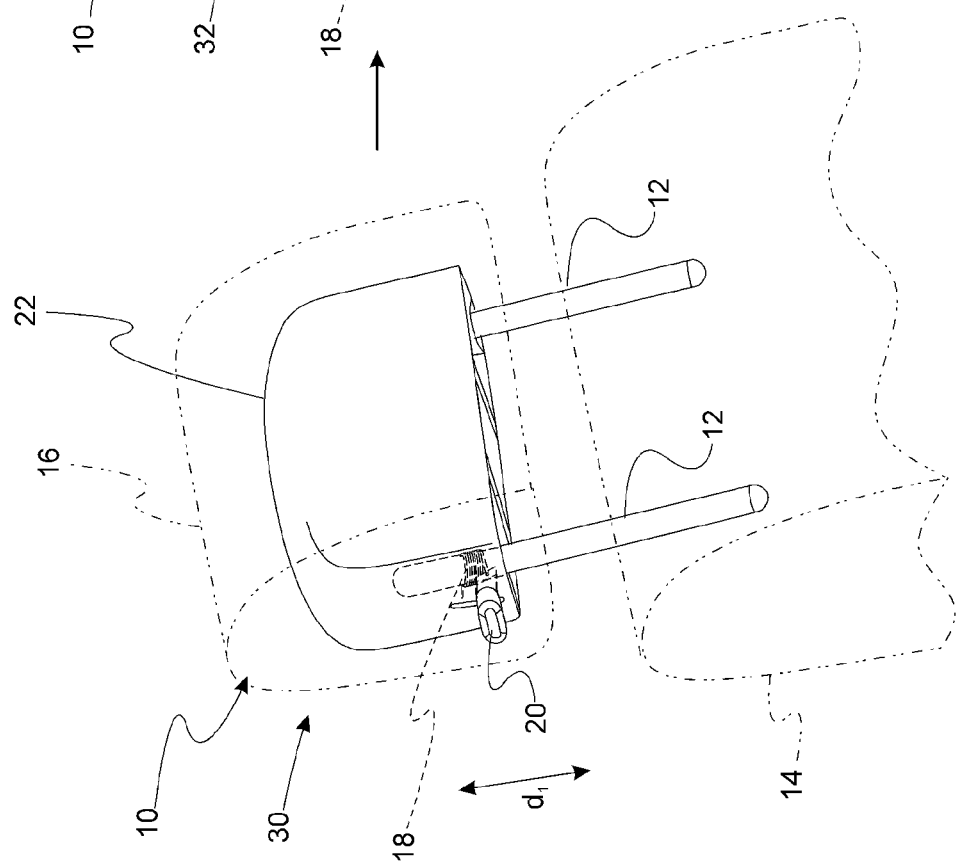

With reference to FIG. 1, a schematic illustration of a head restraint assembly integrated into a vehicle seat assembly is provided. Head restraint assembly 10 includes post(s) 12 that are adapted to engage vehicle seat 14. Head restraint assembly 10 also includes bun 16 which is moveably attached to post(s) 12. Locking clasp 18 is fixed relative to bun 16. Typically, locking clasp 18 is directly or indirectly attached to bun 16. Locking clasp 18 has an open configuration and a closed configuration. The open configuration allows movement of bun 16 along direction $d_1$ relative to post(s) 12. The closed configuration inhibits movement of bun 16 relative to post(s) 12. Advantageously, the position of bun 16 is adjustable to any value between a first position and a second position when the locking clasp is in the open configuration. Normally, the locking clasp will be in the closed configuration so that the head restraint does not inadvertently move. Therefore, typically, a user must actuate locking clasp from the closed to the open configuration with an actuator such as knob 20.

Still referring to FIG. 1, head restraint assembly 10 includes structure 22 which is attached to post(s) 12. Support structure 22 provides structural support and stability to head restraint assembly 10. Moreover, in the specific variation depicted, support structure 22 provides a structure to which locking clasp 18 is attached thereby fixing it relative to bun 16. Further depicted in this variation, knob 20 is used to position locking clasp 18 in the closed and open configurations. Head restraint assembly 10 is shown to be initially in lowered position 30. Movement of knob 20 in the general direction $d_1$ opens locking clasp 18 so that bun 16 is positionable to raised position 32.

Figure 2:
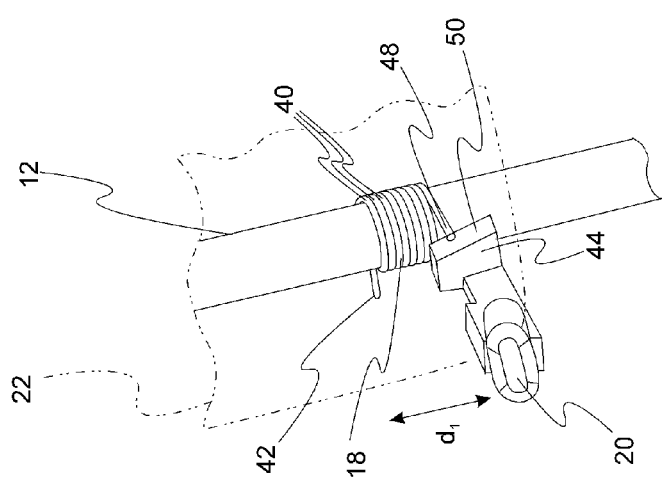
FIG. 2 is a schematic illustration of the locking clasp used in FIG. 1.

With reference to FIG. 2, a schematic illustration of the locking clasp used in FIG. 1 is provided. In the present variation, locking clasp 18 is a spring or spring-like structure having one or more windings 40. The locking clasp of this variation is referred to herein as a "locking spring." One or more windings 40 are positioned around at least a portion of post(s) 12. In a refinement of this variation, one or more windings 40 contacts the post with a first force sufficient to impede movement of bun 16 relative to post(s) 12 when the locking clasp is in the closed configuration. Also in this refinement, one or more windings 40 contact post(s) 12 with a second force that allows movement of the bun relative to the post when locking clasp 18 is in the open configuration. In a further refinement, the second force being less than the first force. One or more windings 40 disengages post(s) 12 when the locking clasp is in an open configuration thereby allowing movement of bun 16 relative to post(s) 12. One or more windings are characterized by a first mean inner diameter when locking clasp 18 is in the closed configuration and a second mean inner diameter when locking clasp 18 is in the open configuration. The first mean inner diameter is less than the second mean inner diameter. A section of locking clasp 18 is attached to support structure 22. In the specific variation depicted in FIG. 1, end 42 is attached to support structure 22. Locking clasp 18 is in communication with actuator section 44. Movement of knob 20 along direction $d_1$ moves actuator section 44 which engages end 48 of locking clasp 18. Movement of actuator section 44 towards the top of head restraint 10 causes locking clasp 18 to open thereby increasing its mean inner diameter. Sloped surface 50 of actuator section 44 allows progressive opening of locking clasp 18 as knob 20 is moved upward. The opening of locking clasp 18 allows for easy movement of post(s) 12 through the opening defined by windings 40 of locking clasp 18. When knob 20 is in a lowered position, the opening is smaller and contacts post(s) 12 with sufficient force to inhibit movement of post(s) 12 through the opening of locking clasp 18.

Figure 3:
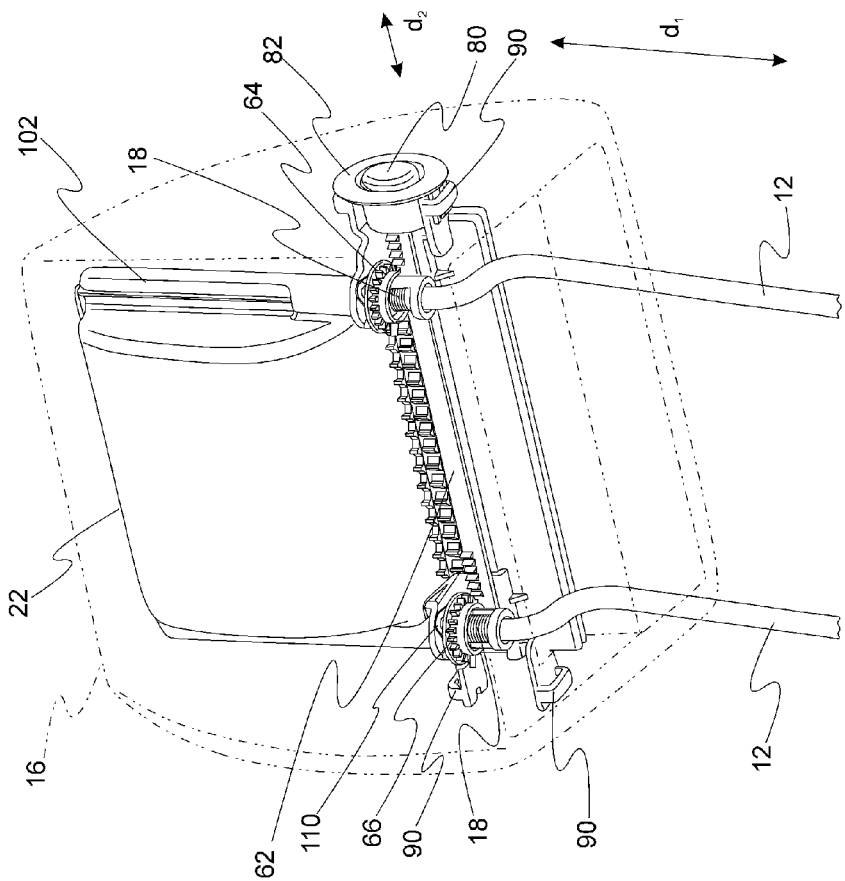
FIG. 3 is a perspective view of a continuously positionable head restraint using a rack and pinion.
Figure 4:
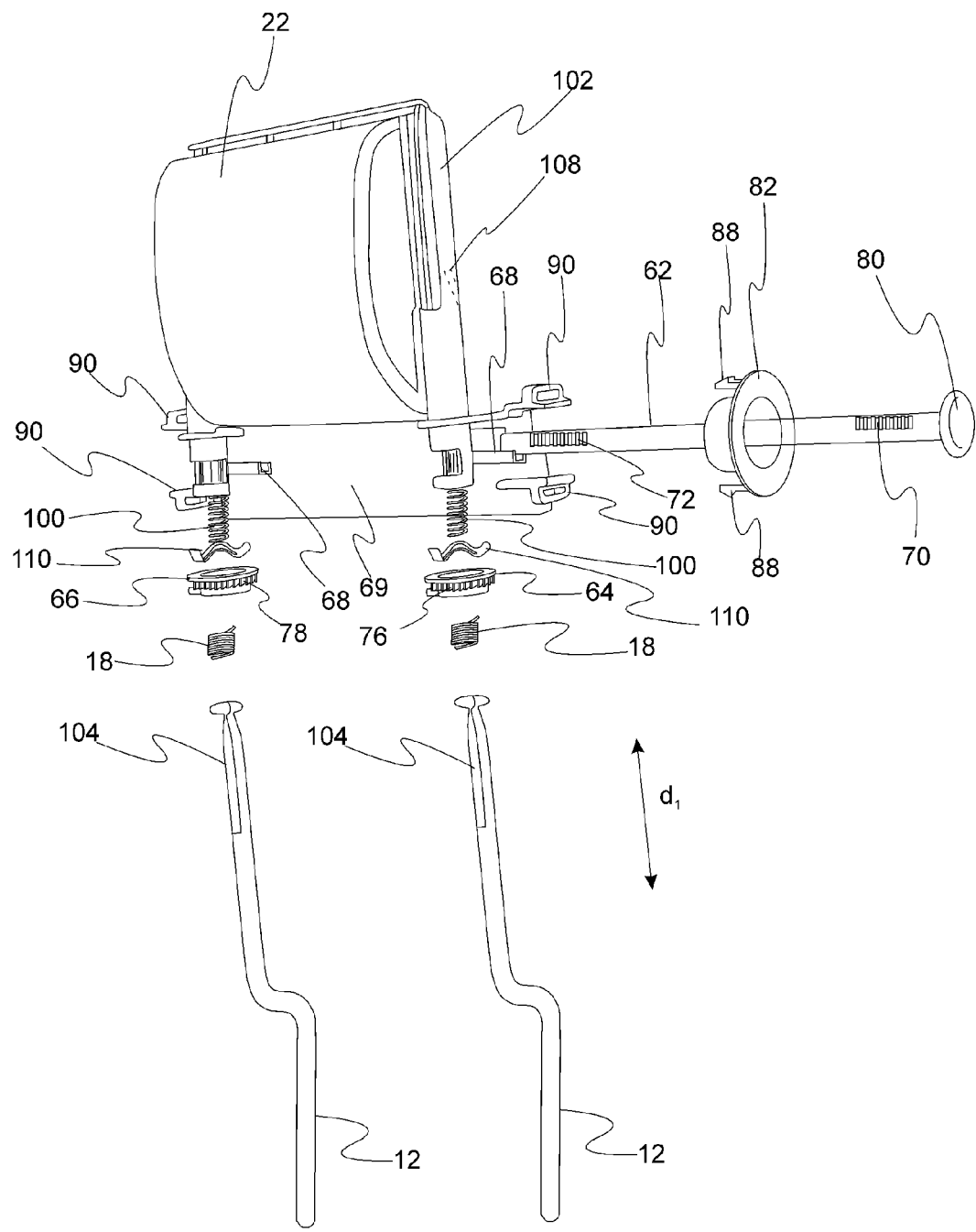
FIG. 4 is an exploded perspective view of the variation depicted in FIG. 3.
Figure 5:
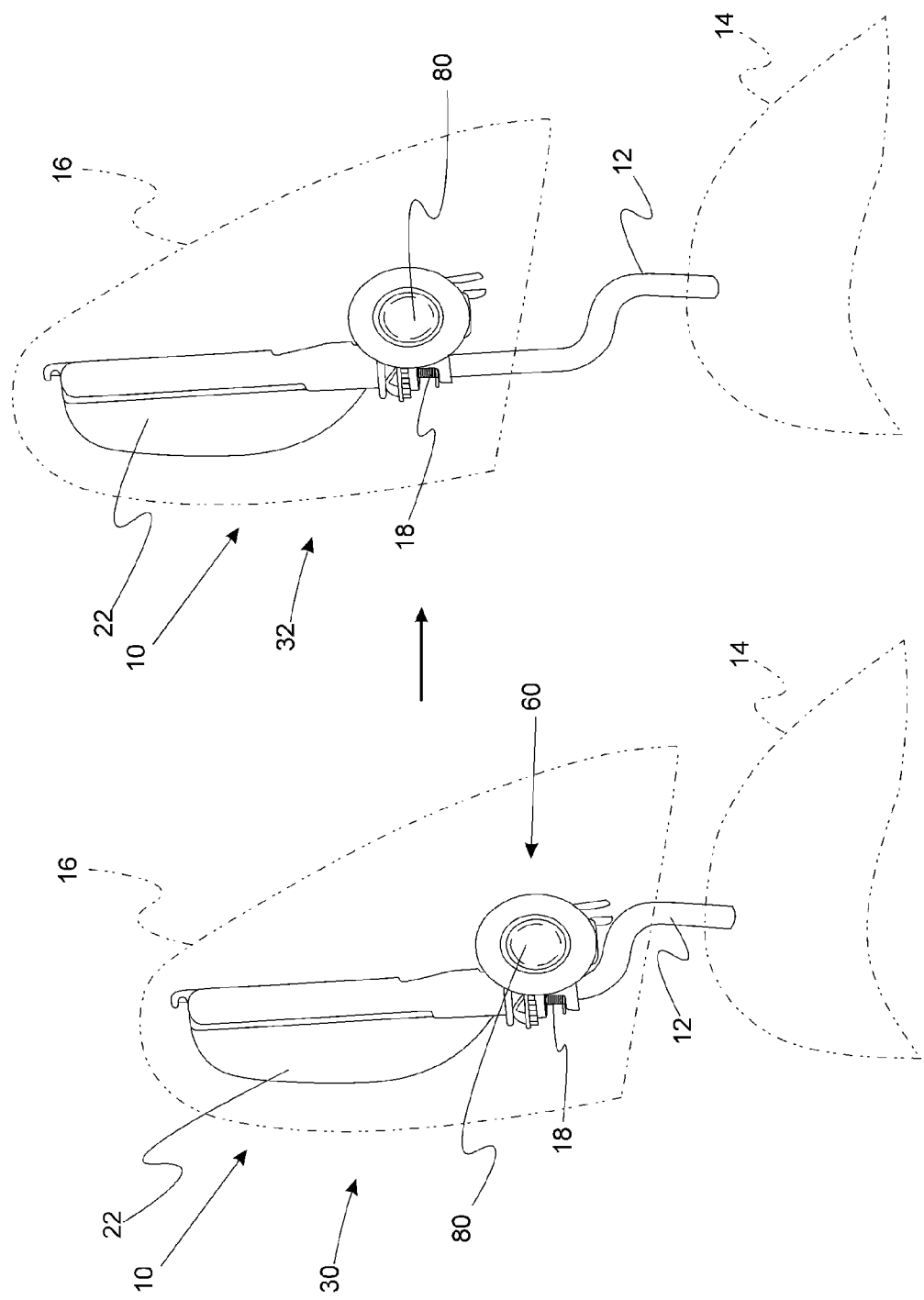
FIG. 5 is a side view showing the transitioning of the head restraint of FIG. 3 from a lowered to raised position.

With reference to FIGS. 3, 4, and 5, schematic illustrations of a variation of a continuously positionable head restraint using a lock and pinion is provided. FIG. 3 is a perspective view of the head restraint of this variation. FIG. 4 is an exploded perspective view of this variation. FIG. 5 is a side view showing the transitioning of the head restraint from a lowered to raised position. In this variation, head restraint assembly 10 includes two locking clasps 18 disposed about posts 12. In a refinement, each of locking clasps 18 is a spring or spring-like structure as described above in connection with the description of FIG. 2. Locking clasps 18 are moved from the closed configuration to the open configuration of rack 62 and pinions 64, 66. Rack 62 is moveably held to support structure 22 via tracks 68. In one variation, tracks 68 are mounted onto plate 69 which is also attached to support structure 22. Rack 62 includes teeth 70, 72 that are adapted to align with mating teeth 76, 78 of pinions 64, 66 such that movement of rack 62 along direction $d_2$ cause rotation of pinions 64, 66.

In an analogous manner as set forth above in connection with the description of FIG. 2, an end of each of locking clasps 18 is fixed relative to support structure 22. The other end of each of locking clasps 18 is fixed to pinions 64, 66 respectively. Button 80 is in communication with rack 62. Actuation of button 80 causes movement of rack 62 along direction $d_2$ such that locking clasps 18 are opened so that post(s) 12 may be moved along direction $d_1$. Accordingly, bun 16 can be moved from a lowered to raised position or from a raised to lowered position. Button receptacle 82 positions button 80 so that rack 62 aligns with tracks 68 thereby positioning teeth 70, 72 in an interlocking arrangement with teeth 76, 78. Tabs 88 of button receptacle 82 attach to receiving receptor 90 holding button receptacle thereto. Receptor 90 is attached support plate 69 which is, in turn, attached to support structure 22. Biasing springs 100 are positioned within tube sections 102 of support structure 22. Sections 104 of posts 12 are positioned within the interior defined by the windings of biasing springs 100. Biasing springs 100 provide a force that tends to push bun 16 upward (away from seat assembly 14) when locking clasps 18 are in the open configuration. Retainers 110 act to keep biasing within tube sections 102 of support structure 22. Posts 12 also include stops 106 which prevent the posts from being completely separated from support structure 22. Tab 108 engages with stops 106 to prevent such separation. Tab 108 is flexible thereby moving out of the way when post 12 is placed within tube sections 102.

Figure 6:
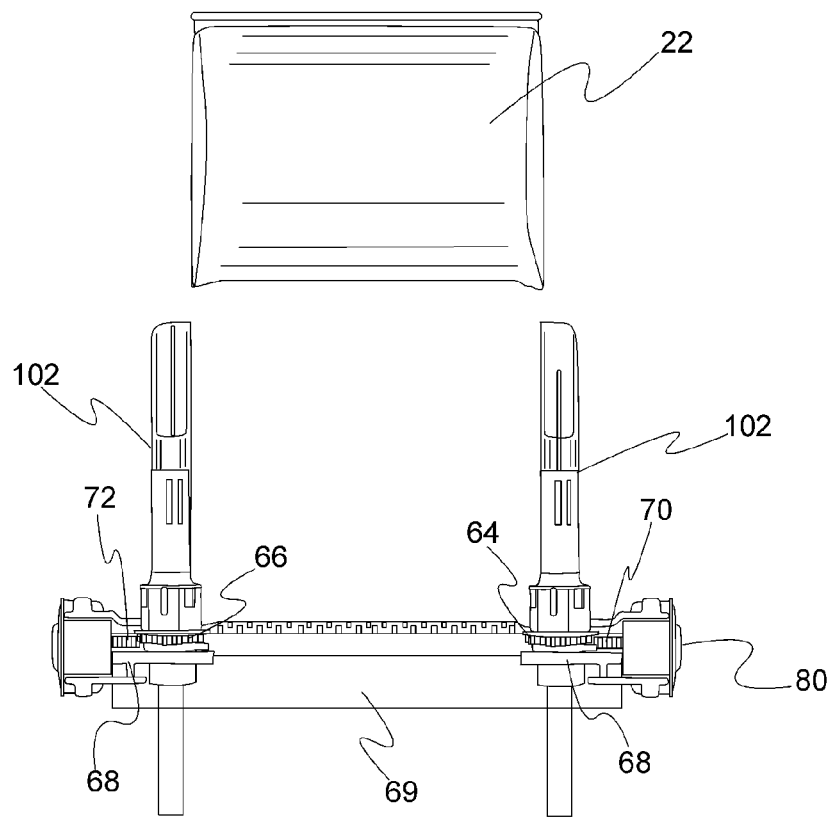
FIG. 6 is a front schematic view of a continuously positionable head restraint in which mounting tube sections are separate from support structure.

With reference to FIG. 6 an alternative variation of head restraints of the invention are provided. FIG. 6 provides a front schematic view of a continuously positionable head restraint in which mounting tube sections 102, 104 are separate from support structure 22. Mounting tube sections 102 are attached to plate 69. In this variation, mounting tube sections 102 are connected to support structure 22. The continuously positionable head restraint systems described above are integrated into this embodiment. Specifically, locking clasps are moved from the closed configuration to the open configuration of rack 62 and pinions 64, 66 as set forth above. Rack 62 is moveably held to support structure 22 via tracks 68. In one variation, tracks 68 are mounting onto plate 69 which is also attached to support structure 22.

Figure 7:
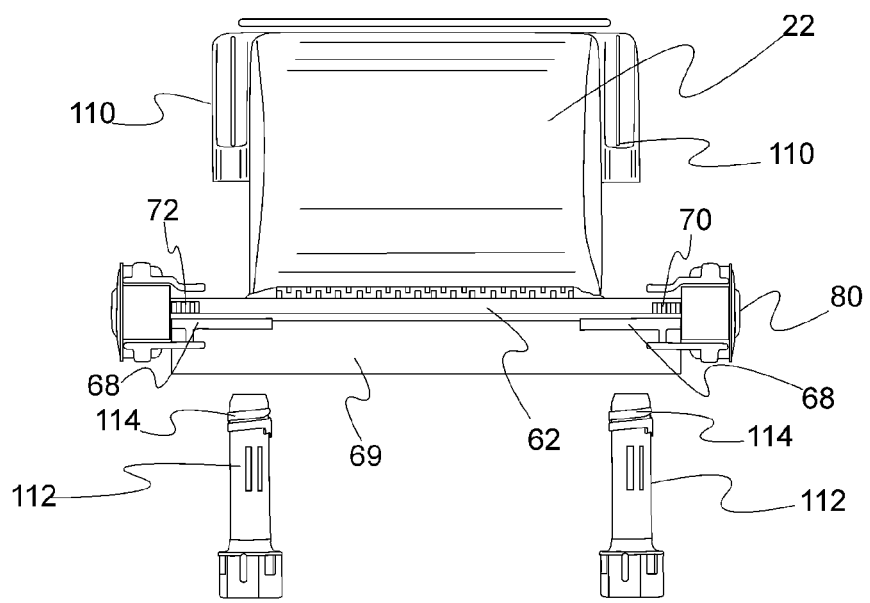
FIG. 7 is a front schematic view of a continuously positionable head restraint in which mounting tube sections are split into two tube sections.

With reference to FIG. 7 another alternative variation of the head restraints of the invention are provided. FIG. 7 provides a front schematic view of a continuously positionable head restraint in which mounting tube sections are split into two tube sections. In this variation, the mounting tube sections include first mounting tube section 110 and second mounting tube section 112. The continuously positionable head restraint systems described above are integrated into this embodiment. Specifically, locking clasps are moved from the closed configuration to the open configuration of rack 62 and pinions 64, 66 as set forth above. Rack 62 is moveably held to support structure 22 via tracks 68. In one variation, tracks 68 are mounted onto plate 69 which is also attached to support structure 22. Mounting tube sections 110 are an integral part of support structure 22. In this variation, first tube section 110 is connected to second tube section 112 during assembly. The variation depicted in FIG. 7, allows for the continuously positionable head restraint embodiments of the invention to be integrated into a number of different vehicle seats. The locking and unlocking mechanisms as used in this configuration is the same as those set forth above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A head restraint assembly for a vehicle seat assembly, the head restraint assembly comprising:

a post adapted to engage a vehicle seat;

a bun moveably attached to the post;

a locking spring attached to the bun, the locking spring having an open configuration and a closed configuration, the open configuration allowing movement of the post relative to the bun and the closed configuration inhibiting movement of the post relative to the bun wherein the locking spring has one or more windings that contact the post with a first force sufficient to impede movement of the bun relative to the post when the locking spring is in the closed configuration, the bun position being adjustable to any value between a first position and a second position; and an actuator that is operable by a user to place the locking spring in the open configuration, wherein the actuator comprises a rack and pinion, the pinion being moveable by the rack and in communication with the locking spring.

2. The head restraint of claim 1 wherein the locking spring is normally in the closed configuration.

3. The head restraint of claim 1 wherein the locking spring engages the post when the locking spring is in a closed configuration.

4. The head restraint of claim 3 wherein the locking spring engages with a force sufficient to impede movement of the bun relative to the bun.

5. The head restraint of claim 1 wherein the one or more windings contacts the post with a second force that allows movement of the bun relative to the post when the locking spring is in an open configuration, the second force being less that the first force.

6. The head restraint of claim 1 wherein the one or more windings disengage the post when the locking spring is in an open configuration thereby allowing movement of the bun relative to the post.

7. The head restraint of claim 1 wherein the one or more windings have a first mean inner diameter when the locking spring is in the closed configuration and a second mean inner diameter when the locking spring is in the open configuration, the first mean inner diameter being less than the second mean inner diameter.

8. The head restraint of claim 1 wherein the bun further comprises a support structure and a tube section adapted to receive the post, the tube section being either attached to or part of the bun.

9. The head restraint of claim 8 the tube section comprising a top tube section and a lower tube section, the top tube section being attachable to the lower tube section.

10. A head restraint assembly for a vehicle seat assembly, the head restraint assembly comprising:

a post adapted to engage a vehicle seat;

a bun moveably attached to the post;

a locking spring attached to the bun, the locking spring having an open configuration and a closed configuration, the open configuration allowing movement of the post relative to the bun and the closed configuration inhibiting movement of the post relative to the bun wherein the locking spring has one or more windings positioned around at least a portion of the post, the bun position being adjustable to any value between a first position and a second position; and an actuator that is operable by a user to place the locking spring in the open configuration, wherein the actuator comprises a rack and pinion, the pinion being moveable by the rack and in communication with the locking spring.

11. The head restraint of claim 8 wherein the one or more windings contact the post with a first force sufficient to impede movement of the bun relative to the post when the locking spring is in the closed configuration.

12. The head restraint of claim 8 wherein the one or more windings contact the post with a second force that allows movement of the bun relative to the post when the locking spring is in an open configuration, the second force being less that the first force.

13. The head restraint of claim 8 wherein the one or more windings disengages the post when the locking spring is in an open configuration thereby allowing movement of the bun relative to the post.

14. The head restraint of claim 8 wherein the one or more windings have a first mean inner diameter when the locking spring is in the closed configuration and a second mean inner diameter when the locking spring is in the open configuration, the first mean inner diameter being less than the second mean inner diameter.

* * * * *

UNITED STATES PATENT AND TRADEMARK OFFICE
CERTIFICATE OF CORRECTION

PATENT NO. : 7,735,929 B2
APPLICATION NO. : 11/755519
DATED : June 15, 2010
INVENTOR(S) : Eric Veine et al.

It is certified that error appears in the above-identified patent and that said Letters Patent is hereby corrected as shown below:

In the claims:

Column 5, Line 29, Claim 5:
After "being less" delete "that" and insert -- than --.

Column 6, Line 22, Claim 11:
After "The head restraint of claim" delete "8" and insert -- 10 --.

Column 6, Line 26, Claim 12:
After "The head restraint of claim" delete "8" and insert -- 10 --.

Column 6, Line 31, Claim 12:
After "being less" delete "that" and insert -- than --.

Column 6, Line 31, Claim 13:
After "The head restraint of claim" delete "8" and insert -- 10 --.

Column 6, Line 35, Claim 14:
After "The head restraint of claim" delete "8" and insert -- 10 --.

Signed and Sealed this

Fifth Day of October, 2010

David J. Kappos
*Director of the United States Patent and Trademark Office*